(12) United States Patent
Klein

(10) Patent No.: US 8,151,789 B2
(45) Date of Patent: Apr. 10, 2012

(54) SOLAR PANEL MOUNTING STRUCTURE

(75) Inventor: Richard Klein, New York, NY (US)

(73) Assignee: Quixotic Systems, Inc., New York, NY (US)

( * ) Notice: Subject to any disclaimer, the term of this patent is extended or adjusted under 35 U.S.C. 154(b) by 49 days.

(21) Appl. No.: 12/334,728

(22) Filed: Dec. 15, 2008

(65) Prior Publication Data

US 2009/0095285 A1 Apr. 16, 2009

Related U.S. Application Data

(62) Division of application No. 11/115,170, filed on Apr. 27, 2005, now Pat. No. 7,481,211.

(51) Int. Cl.
*F24J 2/52* (2006.01)
(52) U.S. Cl. .............. 126/704; 126/621; 126/906
(58) Field of Classification Search .............. 126/651 O, 126/906 X, 621, 624, 704; 29/428
See application file for complete search history.

(56) References Cited

U.S. PATENT DOCUMENTS

| | | | | |
|---|---|---|---|---|
| 4,000,850 A | * | 1/1977 | Diggs | 126/613 |
| 4,121,397 A | * | 10/1978 | Marcocci et al. | 52/286 |
| 4,148,293 A | * | 4/1979 | Lents et al. | 126/632 |
| 4,210,463 A | * | 7/1980 | Escher | 136/246 |
| 4,390,010 A | * | 6/1983 | Skillman | 126/621 |
| 4,407,268 A | * | 10/1983 | Jardin | 126/618 |
| 6,000,393 A | | 12/1999 | Moore | |
| 6,302,099 B1 | | 10/2001 | McDermott | |
| 6,360,491 B1 | | 3/2002 | Ullman | |
| 6,437,232 B1 | | 8/2002 | Dailey et al. | |
| 6,443,145 B1 | | 9/2002 | Buron et al. | |
| 2002/0001529 A1 | * | 1/2002 | Tormaschy et al. | 417/423.9 |
| 2004/0187861 A1 | * | 9/2004 | Harrison et al. | 126/651 |
| 2009/0095285 A1 | | 4/2009 | Klein | |

FOREIGN PATENT DOCUMENTS

| | | |
|---|---|---|
| JP | 11247387 A | 9/1999 |
| JP | 2000027395 A | 1/2000 |
| JP | 2001144314 A | 5/2001 |

OTHER PUBLICATIONS

Advisory Action for U.S. Appl. No. 11/115,170 (U.S. Patent No. 7,481,211), mailed Oct. 20, 2008.
Office Action made Final for parent U.S. Appl. No. 11/115,170, mailed Apr. 28, 2008.
Non-Final Office Action for parent U.S. Appl. No. 11/115,170, mailed Oct. 12, 2007.

* cited by examiner

*Primary Examiner* — Alfred Basichas
(74) *Attorney, Agent, or Firm* — Tech Valley Patent, LLC; John Pietrangelo

(57) ABSTRACT

A method and apparatus for mounting solar panels is provided. Preferably, the apparatus includes a base, a solar panel receiving structure, and a support structure coupling the base to the solar panel receiving structure such that the solar panel receiving structure is at least one of elevated and angled relative to the base. The solar panel receiving structure preferably includes a base member, a first side member coupled to the base member, and a second side member coupled to the base member. Preferably, the first side member and the second side member are slotted so as to slidably receive at least one solar panel between the first side member, the second side member, and the base member.

12 Claims, 5 Drawing Sheets

SOLAR PANEL MOUNTING STRUCTURE

CROSS-REFERENCE TO RELATED APPLICATION

This is a divisional of U.S. Ser. No. 11/115,170 filed Apr. 27, 2005 now U.S. Pat. No. 7,481,211, which application is fully incorporated herein by reference.

BACKGROUND OF THE INVENTION

1. Field of the Invention

The present invention relates generally to solar panel mounting structures, and more particularly to a method and apparatus for slidably retaining one or more solar panels in a solar panel receiving structure.

2. Description of the Related Art

Methods and apparatuses for mounting solar panels are known. Exemplary systems are disclosed, for example, in U.S. Pat. Nos. 6,302,099; 6,360,491; 6,437,232; and 6,443,145, and Japanese References JP 2000-027395; JP 11-247387; and JP 2001-144314, which are all incorporated by reference herein in their entirety. The '145 patent is discussed in greater detail below for illustration purposes.

The '145 patent discloses a solar tracking device which automatically or manually tracks the sun for a maximum daily intake of solar energy. In particular, the disclosed solar tracking device includes a solar panel carriage assembly, a mounting assembly, and a travel assembly. The mounting assembly attaches the solar panel carriage assembly to the travel assembly, which supports the entire assembly as it moves. A variety of solar panels may be used with the disclosed structure as is described below.

The solar panel carriage assembly is configured to hold a variety of sized solar panels in a solar panel carriage. In particular, the solar panel carriage assembly includes a solar panel carriage with side supports, a bottom support, a center support, a down rest arm, and a top support. Solar panels are positioned on the center support between side supports with a open space between adjacent panels.

While the solar tracking device disclosed in the '145 patent may, by tracking the sun, increase the total solar energy collected, the disclosed assembly is difficult to build and costly to manufacture due in part to the large number of parts and driving mechanism. Further, the disclosed assembly is limited in scalability for large or small applications. As such, a need exists for an improved solar panel mounting structure.

Other problems with the prior art not described above can also be overcome using the teachings of the present invention, as would be readily apparent to one of ordinary skill in the art after reading this disclosure.

DETAILED DESCRIPTION OF THE EXEMPLARY EMBODIMENTS

Reference will now be made in detail to exemplary embodiments of the present invention. Wherever possible, the same reference numbers will be used throughout the drawings to refer to the same or like parts.

Figure 10:
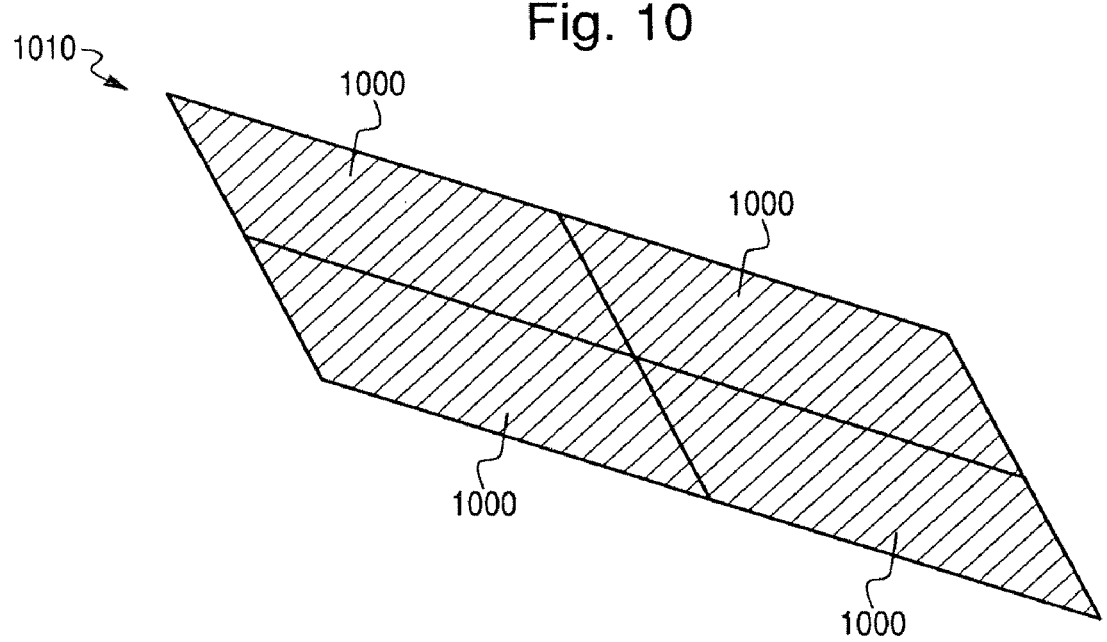
FIG. 10 is a perspective view of a solar panel array including a plurality of individual solar panels according to an embodiment of the present invention.

The present invention discloses various embodiments for mounting panels, such as solar panels 1000 and solar panel arrays 1010 as shown in FIG. 10. It should be appreciated, however, that other structures could also be mounted using various embodiments of the present invention, as would be readily understood by those of skill in the art after reading this disclosure. Thus, the following embodiments directed at solar panels 1000 and/or solar panel arrays 1010 are provided for illustration purposes only.

A solar panel mounting structure 100 according to a first embodiment of the present invention is shown in FIGS. 1-7. The disclosed solar panel mounting structure 100 may be used, for example, to removably mount solar panels 1000 or an array of solar panels 1010 (FIG. 10) on a substantially flat surface. As an example, the solar panel mounting structure 100 may be used to mount solar panels 1000 on a building rooftop, such as a residential or commercial building with a substantially horizontal or slightly angled roof. Other applications are also contemplated.

Figure 1:
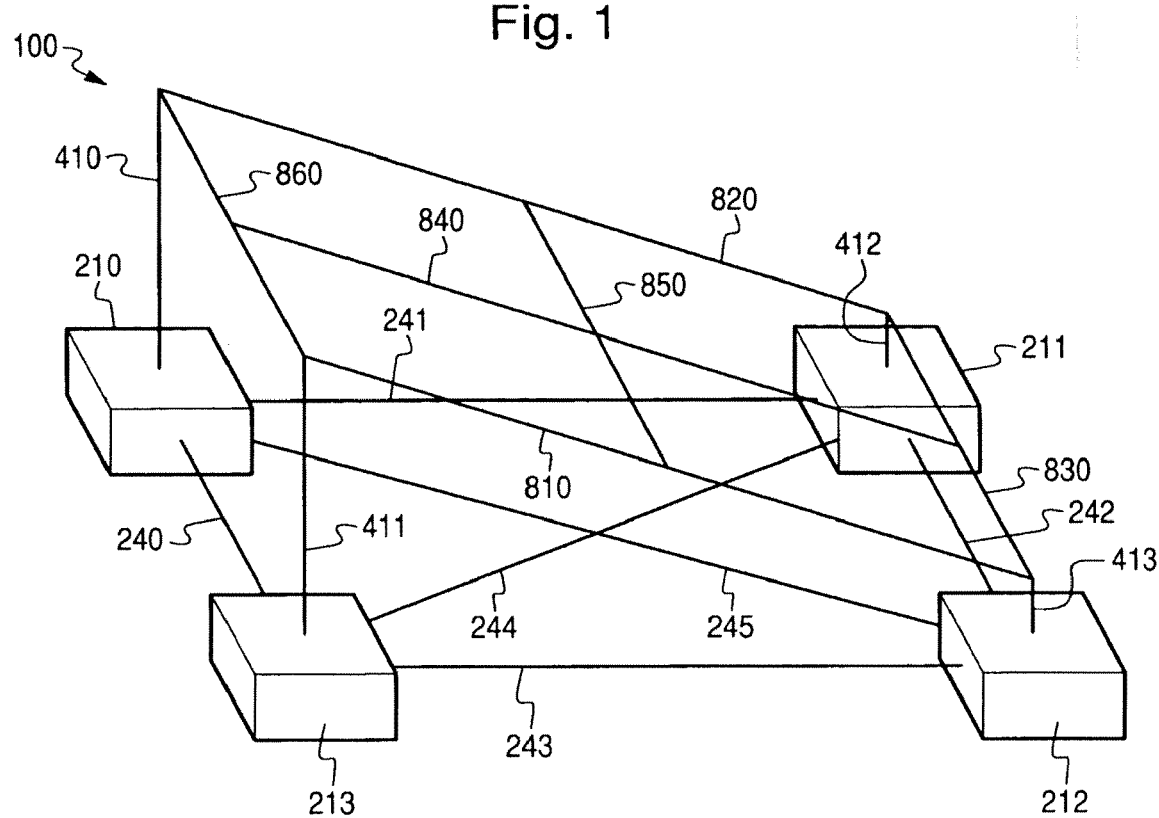
FIG. 1 is a perspective view of a solar panel mounting structure according to an embodiment of the present invention.
Figure 2:
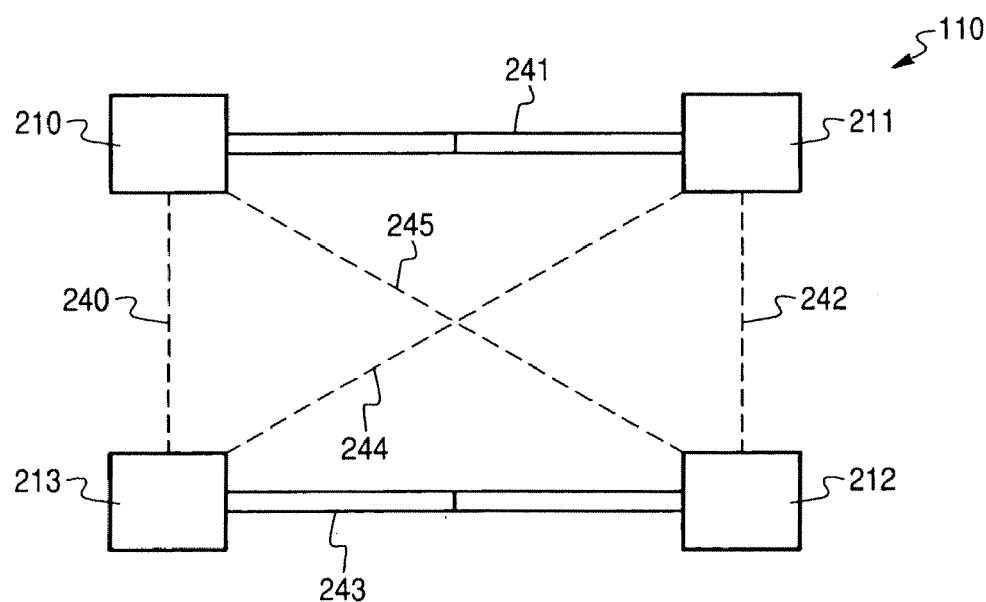
FIG. 2 is a bottom view of the solar panel mounting structure of FIG. 1, showing optional diagonal beams and telescoping side beams.
Figure 3:
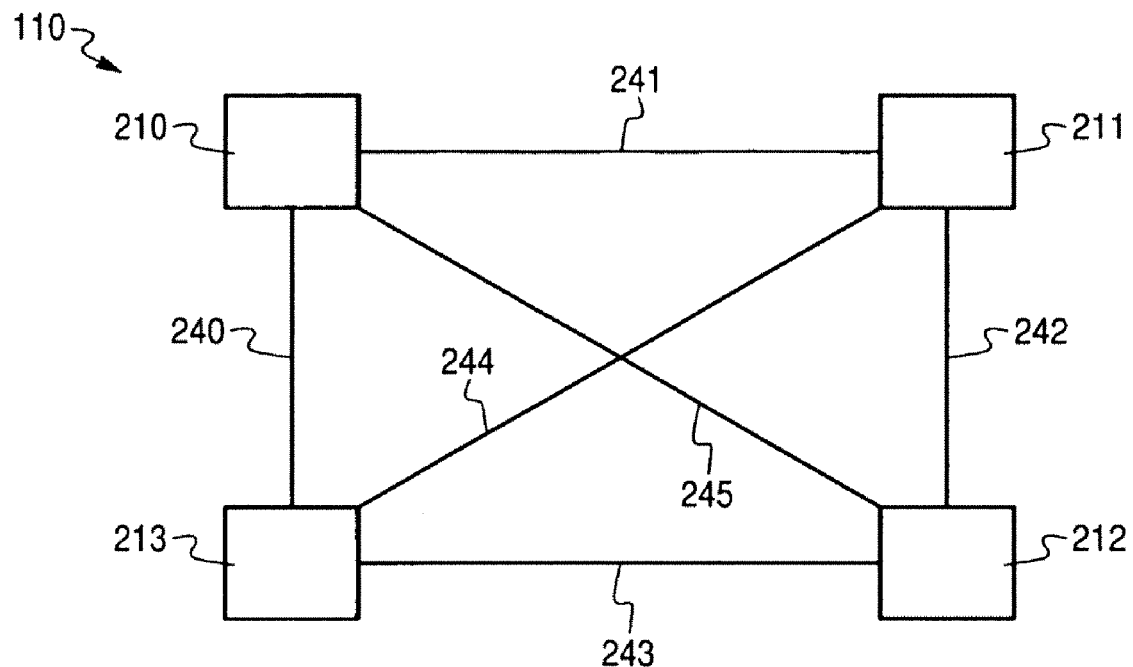
FIG. 3 is another bottom view of the solar panel mounting structure of FIG. 1.
Figure 4:
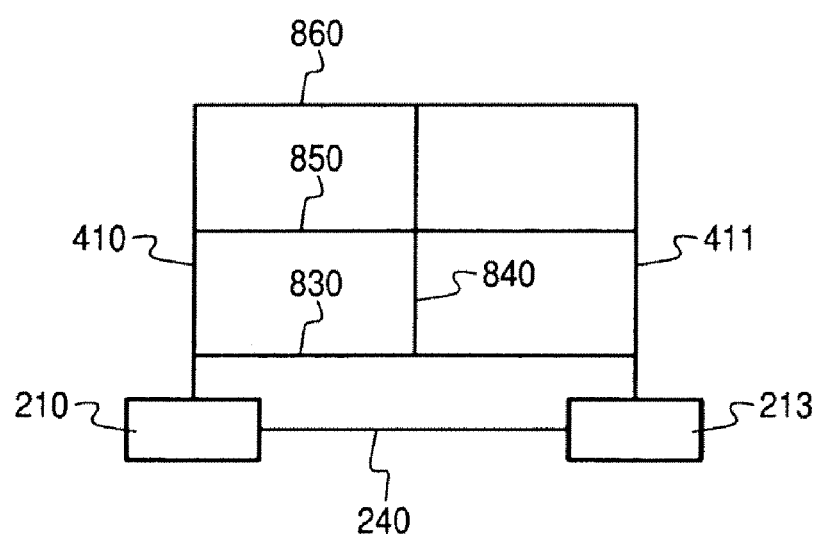
FIG. 4 is a rear view of the solar panel mounting structure of FIG. 1.
Figure 5:
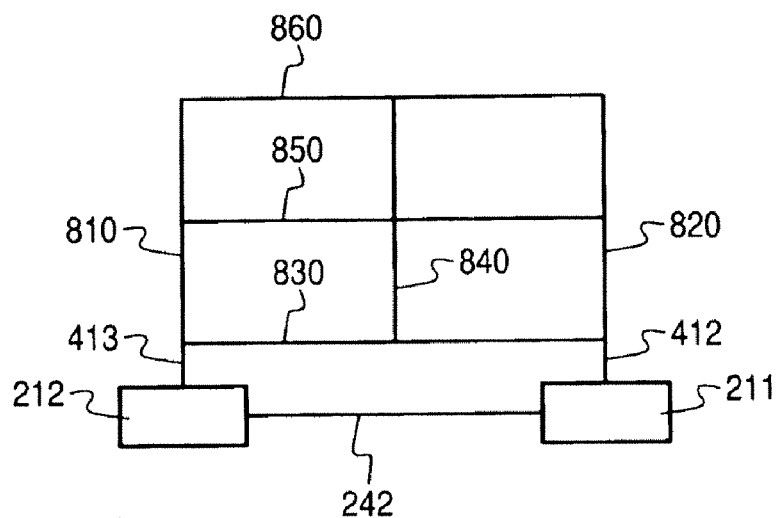
FIG. 5 is a front view of the solar panel mounting structure of FIG. 1.
Figure 6:
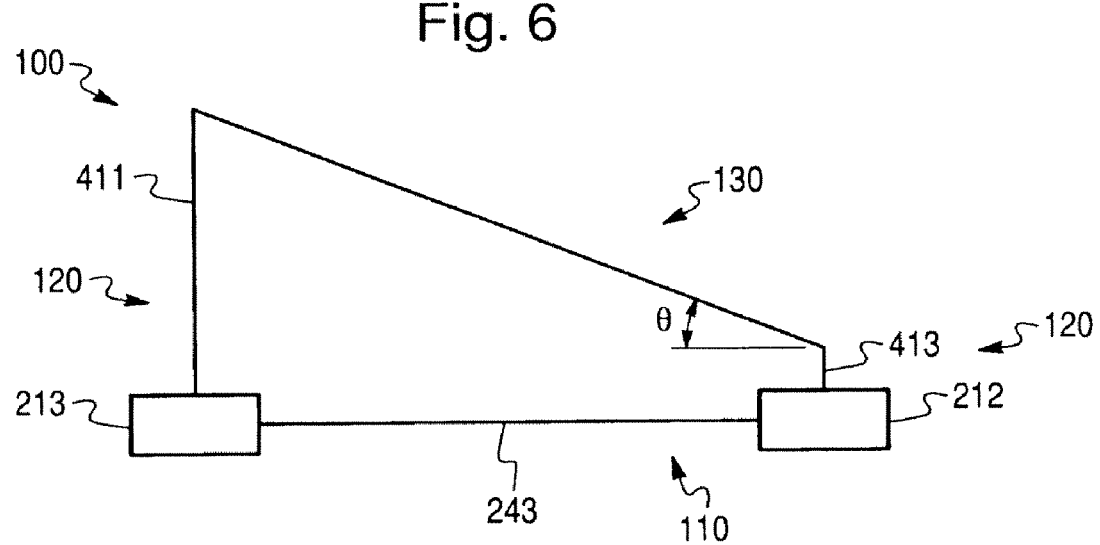
FIG. 6 is a side view of the solar panel mounting structure of FIG. 1.
Figure 7:
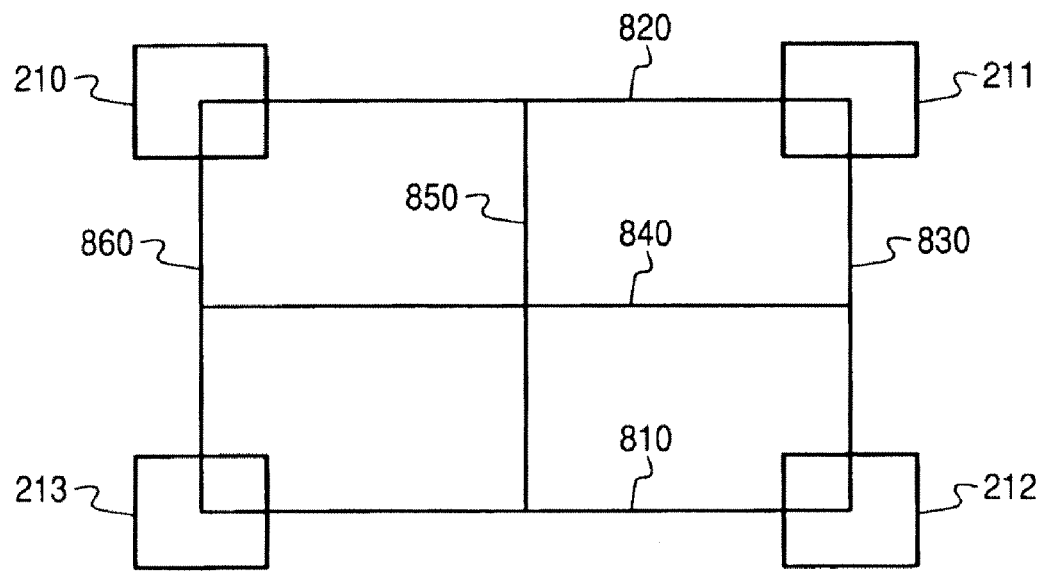
FIG. 7 is a top view of the solar panel mounting structure of FIG. 1.
Figure 8:
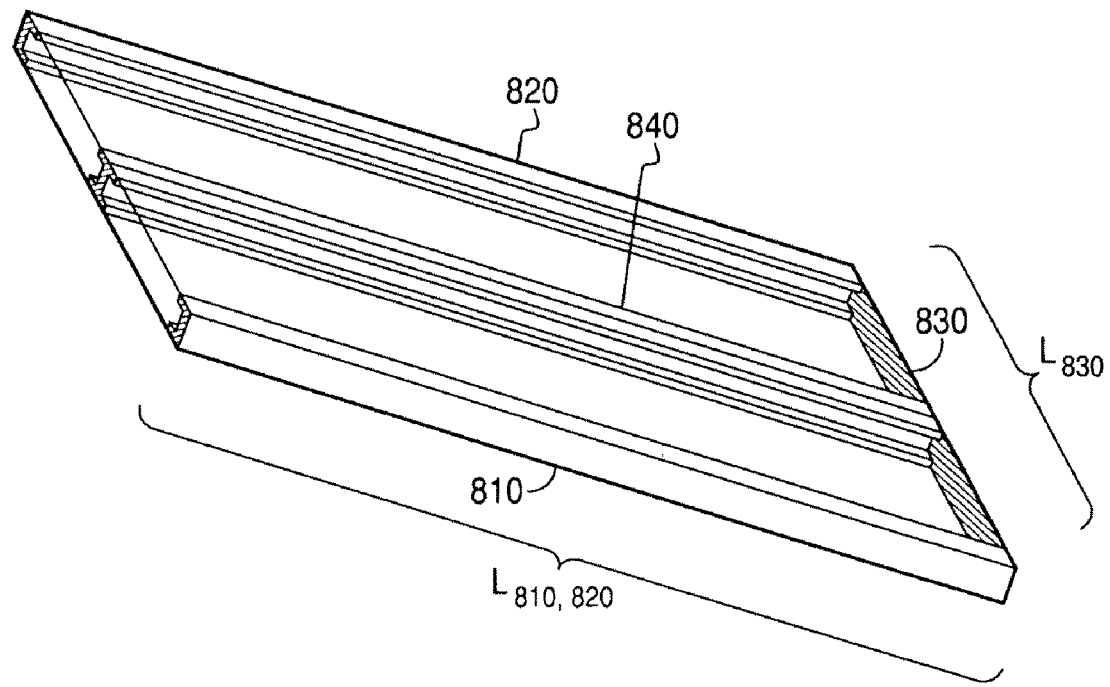
FIG. 8 is a perspective view of a solar panel receiving structure according to an embodiment of the present invention.
Figure 9:
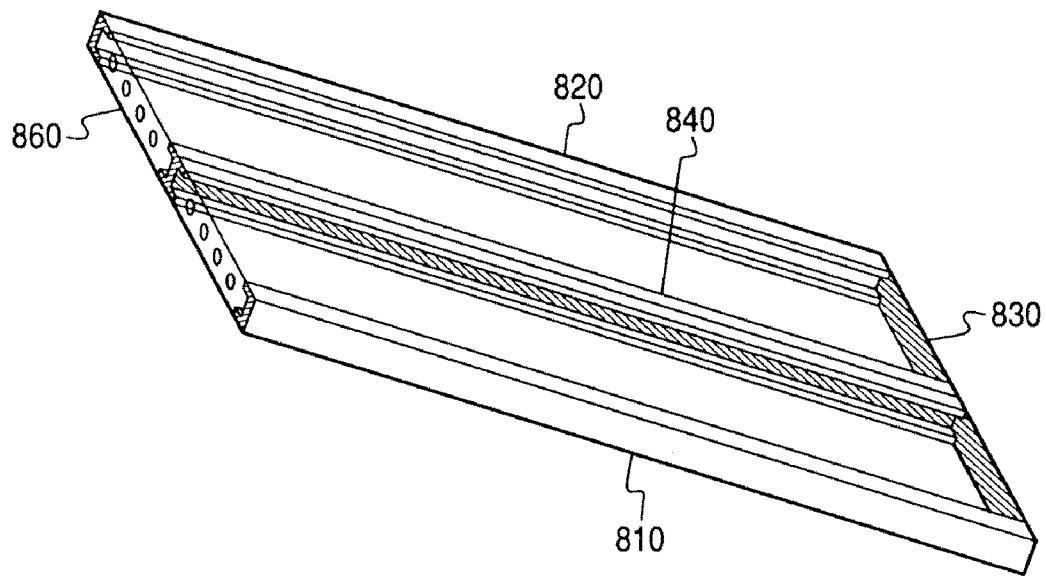
FIG. 9 is a perspective view of the solar panel mounting structure of FIG. 8 with an optional retainer.

The depicted solar panel mounting structure 100 includes a base 110, a solar panel receiving structure 130, and support structure 120. As shown best in FIGS. 8 and 9, the solar panel receiving structure 130 is adapted and configured to slidably receive one more solar panels 1000 therein. In particular, the solar panel receiving structure 130 may include a base member 830, a first side member 810 coupled to the base member 830, and a second side member 820 coupled to the base member 830, wherein the first side member 810 and the second side member 820 are slotted (e.g., having a substantially C-channel or U-channel shape) so as to receive at least one solar panel 1000 between the first side member 810, the second side member 820, and the base member 830. It should be appreciated that the base member 830 may or may not also be slotted to more securely retain the solar panel(s) 1000 in the solar panel receiving structure 130 depending on the particular implementation requirements.

According to one embodiment of the present invention, the solar panel receiving structure 130 may also include one or more dividing members 840, 850. As an example, the solar panel receiving structure 130 may include a first dividing member 840 coupled to the base member 830 between the first and second side members 810, 820 and oriented substantially parallel to the first and second side members 810, 820. If provided, the solar panel receiving structure 130 may slidably receive a first solar panel between the first side member 810 and the first dividing member 840, and a second solar panel between the second side member 820 and the first dividing member 840.

As another example, the solar panel receiving structure 130 may include a second dividing member 850 in addition to or alternative to the first dividing member 840 discussed above. If provided, the second dividing member 850 may be coupled to the first and second side members 810, 820 and oriented substantially parallel to the base member 830. A first solar panel may then be slidably received between the first side member 810, the second side member 820, the base member 830, and the second dividing member 850. Further, a second solar panel may be slidably received between the first side member 810, the second side member 820, and the second dividing member 850 on a side opposite to the base member 830.

It should be appreciated that the first and/or second dividing member 840, 850 may be slotted so as to facilitate greater retention of any solar panels received within the solar panel receiving structure 130. Additionally, it is contemplated to use a plurality of first dividing members 840, a plurality of second dividing members 850, and/or a combination of one or more first dividing members 840 with one or more second dividing members 850 so as to receive an array of solar panels 1010 within the solar panel receiving structure 130. Other arrangements and variations are also contemplated, including integral first/second dividing members 840, 850, individual first/second dividing members 840, 850, telescoping first/second dividing members 840, 850, and multi-part first/second dividing members 840, 850.

According to another embodiment of the present invention, the solar panel receiving structure 130 further includes a retainer 860 coupled to the first side member 810 and the second side member 820 opposite the base member 830. The retainer 860 may or may not be slotted, so as to facilitate greater retention of any solar panels 1000 received within the solar panel receiving structure 130.

As described above, the solar panel receiving structure 130 is provided to slidably receive at least one solar panel 1000 therein. It should be appreciated that various components of the solar panel receiving structure 130 may be adapted and configured to have an adjustable length (e.g., telescoping members), or may be easily interchanged with corresponding members of different length, in order to accommodate solar panels of differing sizes. As an example, a length $L_{830}$ of the base member 830 may be reduced to accommodate more narrow solar panels 1000 or lengthened to accommodate wider solar panels 1000. Similarly, a length $L_{810,820}$ of the first side member 810 and the second side member 820 may be reduced to accommodate shorter solar panels 1000 or lengthened to accommodate longer solar panels 1000. As such, one or more of $L_{810}$, $L_{820}$, and $L_{830}$ may be lengthened or shortened, such as slidably with a telescoping member or replaceably with interchangeable members. Other variations are also contemplated.

It is also contemplated to elevate and/or angle the solar panel receiving structure 130 relative to the base 110. In particular, the support structure 120 may couple the base 110 to the solar panel receiving structure 130 in such a manner that the solar panel receiving structure 130 is elevated and/or angled relative to the base 110. Various aspects of the support structure 120 are described in greater detail below in order to better illustrate these capabilities.

According to one embodiment of the present invention, the support structure 120 includes a plurality of supporting members 410-413, such as beams, fixed at one end to the base 110 and fixed at another end to the solar panel receiving structure 130. The plurality of supporting members 410-413 may have a length sufficient to elevate one end of the solar panel receiving structure 130 a desired amount from the base 110. As an example involving a configuration with a maximum 25° elevation angle, the plurality of supporting members 410-413 may have a length sufficient to elevate one end of the solar panel receiving structure 130 at least about three feet six inches above the base 110 for optimal solar insulation. It is further contemplated to provide supporting members 410-413 with an adjustable length, such as providing telescoping supporting members or replacing supporting members 410-413 with other supporting members of different lengths. By providing an adjustable length, the elevation of the solar panel receiving structure 130 relative to the base 110 may correspondingly be adjusted.

According to another embodiment of the present invention, a length of a first end of the supporting structure 120 may be different than a length of a second end of the supporting structure 120 such that a plane of the base 110 is angled by θ° relative to a plane of the solar panel receiving structure 130. In this regard, it should be appreciated that the "first end" and "second end" of the supporting structure 120 may correspond to opposing corners of the supporting structure (e.g., beams 410 and 413, or beams 411 and 412), or opposing sides of the supporting structure (e.g., beams 410, 412 and 411, 413, or beams 410, 411 and 412, 413). It should further be appreciated that a length of at least one of the first end and the second end of the supporting structure 120 may be adjustable such that the angle θ° between the plane of the base 110 and the plane of the solar panel receiving structure 130 may be correspondingly adjustable. According to one aspect of the present invention, the angle θ° between the plane of the base 110 and the plane of the solar panel receiving structure 130 may be adjustable from about 0° (i.e., substantially parallel) to about 45°, more preferably from about 0° to about 25°.

As explained above, the supporting structure 120 may elevate and/or angle the solar panel receiving structure 130 relative to the base 110. As such, the base 110 is configured to support the supporting structure 120 and the solar panel receiving structure 130 thereon. Preferably, the base 110 is adapted and configured to be mounted on a substantially flat surface, such as a building roof. The base 110 may be fixedly mounted on the surface (e.g., with bolts, screws, cement, etc.) or may be of sufficient weight so as to withstand typical wind speeds (e.g., about 120 mph) without significant movement. Variations on the base structure are contemplated, as indicated by the embodiments discussed in greater detail below.

According to one embodiment of the present invention, the base 110 includes one or more blocks 210-213 that can be coupled to the support structure 120. As an example, the blocks 210-213 may be formed of a substantially solid rubber material or the like, such as recycled rubber. Using a recycled material to form the base blocks 210-213 is environmentally friendly and may be more cost effective than other materials which could also be used.

According to another embodiment of the present invention, the one or more blocks 210-213 are interconnected with a plurality of base members 240-245, such as beams. Preferably, at least four base members 240-243 are used to interconnect at least four blocks 210-213. Additionally, one or more substantially diagonal members 244, 245 may be provided to interconnect opposite corners of the base 110. If implemented, the plurality of base members 240-245 may provide greater structural integrity to the base 110, thereby reducing flexing of the base structure and improving performance particularly for windy environments. Other configurations are also contemplated.

The disclosed solar panel mounting structure 100 is relatively easy to build and inexpensive to manufacture. The structure may be easily scaled up or down to accommodate small or large commercial and domestic applications. Other advantages and features will also become apparent to those of skill in the art after practicing one or more embodiments of the present invention.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. As an example, it is contemplated to use plates, beams and/or clamps for various components (e.g., for side members, base members, dividing members, and/or retaining members), which may be made of aluminum, galvanized steel, stainless steel, or other suitable material. The embodiments were chosen and described in order to explain the principles of the invention and its practical application to enable one skilled in the art to utilize the invention in various embodiments and with various modifications as are suited to the particular use contemplated.

| PARTS LIST | |
|---|---|
| angle between plane of base 110 and plane of solar panel receiving structure 130 | θ |
| base | 110 |
| base member (of receiving structure) | 830 |
| beams (of base member) | 240-245 |
| beams (of support structure) | 410-413 |
| blocks (of base) | 210-213 |
| first dividing member (of receiving structure) | 840 |
| first side member (of receiving structure) | 810 |
| length of base member 830 | $L_{830}$ |
| length of first and second side members 810, 820 | $L_{810,820}$ |
| retainer (of receiving structure) | 860 |
| second dividing member (of receiving structure) | 850 |
| second side member (of receiving structure) | 820 |
| solar panel | 1000 |
| solar panel array | 1010 |
| solar panel mounting structure | 100 |
| solar panel receiving structure | 130 |
| support structure | 120 |

What is claimed is:

1. A rooftop solar panel mounting structure comprising:
   a base having a sufficient weight to retain the base on a surface of the rooftop without fixing the base to the surface of the rooftop;
   a solar panel receiving structure mounted to the base and adapted to slidingly receive and retain a plurality of solar panels; and
   means for adjustably elevating and angling the solar panel receiving structure above the base;
   wherein the solar panel receiving structure comprises slotted members adapted to receive the plurality of solar panels.

2. The rooftop solar panel receiving structure as recited in claim 1, wherein the plurality of solar panels comprises a plurality of substantially flat solar panels, and wherein adapted to slidingly receive the plurality of solar panels comprises adapted to adjustably receive the plurality of solar panels into the solar panel receiving structure.

3. The rooftop solar panel receiving structure as recited in claim 1, wherein the plurality of solar panels comprises a plurality of substantially flat solar panel arrays.

4. The rooftop solar panel mounting structure as recited in claim 1, wherein the mounting structure comprises a photovoltaic solar panel mounting structure.

5. The rooftop solar panel mounting structure as recited in claim 1, wherein the base having the sufficient weight to retain the base on a surface of the rooftop comprises a plurality of solid blocks.

6. The rooftop solar panel mounting structure as recited in claim 5, wherein the plurality of solid blocks are interconnected to provide enhanced structural integrity to the base.

7. A rooftop solar panel mounting structure comprising:
   a base having a sufficient weight to retain the base on a surface of the rooftop without fixing the base to the surface of the rooftop;
   a solar panel receiving structure mounted to the base and adapted to slidingly receive and retain a plurality of solar panels; and
   means for adjustably elevating and angling the solar panel receiving in structure above the base;
   wherein the base having the sufficient weight to retain the base on a surface of the rooftop comprises a plurality of solid blocks.

8. The rooftop solar panel mounting structure as recited in claim 7, wherein the plurality of solid blocks are interconnected to provide enhanced structural integrity to the base.

9. The rooftop solar panel receiving structure as recited in claim 7, wherein the plurality of solar panels comprises a plurality of substantially flat solar panels, and wherein adapted to slidingly receive the plurality of solar panels comprises adapted to adjustably receive the plurality of solar panels into the solar panel receiving structure.

10. The rooftop solar panel receiving structure as recited in claim 7, wherein the plurality of solar panels comprises a plurality of substantially flat solar panel arrays.

11. The rooftop solar panel mounting structure as recited in claim 7, wherein the mounting structure comprises a photovoltaic solar panel mounting structure.

12. The rooftop solar panel mounting structure as recited in claim 7, wherein the solar panel receiving structure comprises slotted members adapted to receive the plurality of solar panels.

\* \* \* \* \*

UNITED STATES PATENT AND TRADEMARK OFFICE
CERTIFICATE OF CORRECTION

PATENT NO.         : 8,151,789 B2
APPLICATION NO.    : 12/334728
DATED              : April 10, 2012
INVENTOR(S)        : Klein It is certified that error appears in the above-identified patent and that said Letters Patent is hereby corrected as shown below:

Column 6, line 21, replace "claim 55" with "claim 5"

Column 6, line 31, cancel the word "in" between "receiving" and "structure"

Signed and Sealed this
Twenty-ninth Day of May, 2012

David J. Kappos
*Director of the United States Patent and Trademark Office*